United States Patent [19]

Gauer

[11] 4,135,899
[45] Jan. 23, 1979

[54] SAFETY FILTER FOR AIR CLEANER

[75] Inventor: Daniel S. Gauer, Apple Valley, Minn.

[73] Assignee: Donaldson Company, Inc., Minneapolis, Minn.

[21] Appl. No.: 800,192

[22] Filed: May 25, 1977

[51] Int. Cl.² .................... B01D 50/00; B01D 46/24
[52] U.S. Cl. ........................................ 55/482; 55/492; 55/493; 55/497; 55/502; 55/503; 55/507; 55/509; 210/338; 210/342; 210/462; 210/497 R; 210/450
[58] Field of Search ................... 55/480–483, 55/492, 493, 498, 502, 503, 506, 507, 509, 529, 323, 330, 337, 428, 521, 497; 210/338, 342, 444, 447, 448, 462, 497 R, 450; 285/DIG. 22

[56] References Cited

U.S. PATENT DOCUMENTS

| 2,398,824 | 4/1946 | Fisk et al. ........................ 55/480 |
| 2,537,992 | 1/1951 | Gross et al. ...................... 55/498 |
| 3,002,870 | 10/1961 | Belgarde et al. ................. 55/498 |
| 3,011,644 | 12/1961 | Farrell et al. .................... 55/509 |
| 3,297,160 | 1/1967 | Humbert, Jr. ..................... 210/444 |
| 3,423,909 | 1/1969 | Bennet et al. .................... 55/502 |
| 3,480,148 | 11/1969 | Bryand ............................ 210/497 R |
| 3,667,785 | 6/1972 | Kapeker ........................ 285/DIG. 22 |
| 3,672,130 | 6/1972 | Sullivan et al. ................... 55/481 |
| 3,884,658 | 5/1975 | Roach ............................. 55/482 |
| 3,918,942 | 11/1975 | Nelson et al. .................... 55/509 |
| 3,980,563 | 9/1976 | Greutert et al. ................. 210/497 R |
| 4,020,783 | 5/1977 | Anderson et al. ................. 55/337 |

FOREIGN PATENT DOCUMENTS 18027 6/1970 Japan ........................................ 55/529

Primary Examiner—Frank W. Lutter
Assistant Examiner—David L. Lacey
Attorney, Agent, or Firm—Merchant, Gould, Smith, Edell, Welter & Schmidt

[57] ABSTRACT

An improved air cleaner having a filter specially adapted for ready insertion and removal without tools, and for improvement of the seal against direct air flow between the inlet and outlet of the cleaner.

8 Claims, 3 Drawing Figures

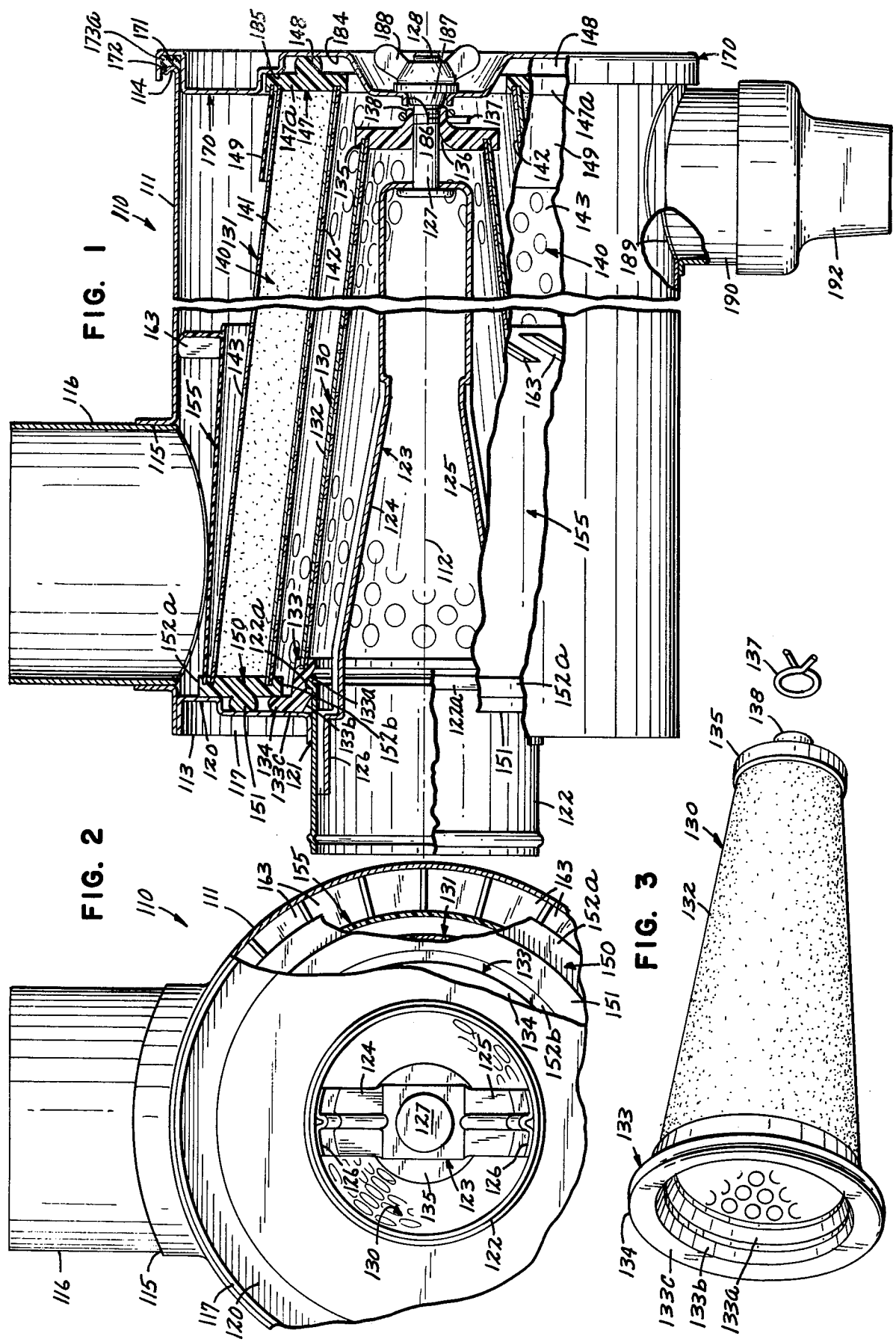

SAFETY FILTER FOR AIR CLEANER

BACKGROUND OF THE INVENTION

This invention relates to the field of air cleaners, and particularly to two-stage air cleaners which include a first, centrifugal stage, or precleaning stage, for removing large particles borne in the air, and a second, filtering stage, in which the filtering means include an outer, principal filter enclosing an inner, "safety" filter.

In such cleaners the filters must be removable for servicing, and such removability often results in crevices through which uncleaned air may be drawn without having its burden of particulate matter removed. When this happens, the cleaner is at least partially inoperative, and damage to equipment downstream in the air line may result.

SUMMARY OF THE INVENTION

The present invention improves the performance of air cleaners by providing sealing means which functions to ensure that no air passes from the inlet to the outlet thereof without having passed through at least the safety filter. It also embodies an improved structure by which insertion and removal of filtering means such as a safety filter is made simpler, quicker, and more certain.

Various advantages and features of novelty which characterize my invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

BRIEF DESCRIPTION OF THE DRAWING

In the drawing,

FIG. 1 is a view in elevation of an air cleaner embodying my invention, parts being broken away for clarity of illustration;

FIG. 2 is an end view of the same cleaner seen from the left in FIG. 1, parts also being broken away; and FIG. 3 is an exploded detailed view of a portion of the invention.

DESCRIPTION OF THE PREFERRED EMBODIMENT

In the drawing an air cleaner 110 is shown to have a housing 111 which is generally cylindrical about an axis 112 extending between a closed end 113 and an open end 114. Housing 111 has a lateral opening 115 near closed end 113, to which is fitted the usual inlet connection member 116. Closed end 113 includes a permanent closure member 117 having an annular inward step 120 and an axial opening 121 with a connection tube 122 fixed therein.

A support yoke 123 has a pair of legs 124 and 125 which diverge to be secured to the inside of tube 122 as shown at 126: the yoke extends along axis 112 and terminates in an axial member 127, externally threaded at its outer end 128, which serves as the outboard support for a safety filter 130 and a principal filter 131.

Safety filter 130 comprises a hollow porous body 132 having a central axis of symmetry coincident with axis 112. Body 132 is conical, tapering from a maximum diameter near end closure 117 to a minimum diameter near member 127. The larger end of filter 130 is molded into a first annular resilient mounting member 133 having an diameter to removably fit over the legs of yoke 123. The radially inward concave surface of annular member 133 has a medial, outwardly directed circumferential internal groove 133a to engage a bead 122a at the inner end of tube 122. A bevel 133b simplifies the positioning of the filter on bead 122a. The axially outer end of member 133 has a flattened surface 133c to sealing engage end closure 117 around opening 121 when groove 133a and bead 122a are engaged, and has a radially outwardly extending lip 134. The smaller end of body 132 is molded into a disk 135 which closes the end of the safety filter except for a central aperture 136 to pass member 127, and which has an axially extending resilient lip 138 sealed securely against 127 by a spring clamp 137.

Principal filter 131 is also conical, tapering from a maximum diameter near closure 117 to a minimum diameter near member 127: conveniently the two filters may have the same apex angle. Filter 131 comprises a body 140 made up of pleated paper 141 between inner and outer protective sheets 142 and 143 having large perforations to transmit air. By reason of the conical configuration the pleats, which lie along lines defined by the intersections with the conical surface of planes passing through axis 112, are more open near the larger end of the filter.

At its smaller end, body 140 is molded into a first mounting member 147 having first and second resilient portions 147a and 148: also molded into member 147 is an axially short conical shield 149 spaced radially from surface 142 and conveniently of the same apex angle. At its larger end body 140 is molded into a second annular mounting member 150 having a resilient portion 151 for engaging end closure 117 and further resilient portions 152a and 152b for engaging respectively annular step 120 of end closure 117 and lip 134 of mounting ring 133.

In order to prevent direct impingement of the air entering the cleaner at 115 on a porous filter surface, a conical baffle 155 surrounds the portion of body 140 near the larger end thereof. Baffle 155 is molded into mounting member 150, and has a smaller apex angle than body 140, so that air can move axially under the baffle from the right, as seen in FIG. 1, and the effective cleaning area of the filter is not materially reduced.

At its end remote from member 150, baffle 155 is configured with a plurality of fins 163 extending angularly with respect to axis 112. The primary purpose of fins 163 is to cause the air passing generally axially through them to have a vortical motion. This produces a centrifugal force by reason of which the larger air borne particles move outward to the inner surface of housing 111 and thereafter move helically therearound toward the open end thereof. Fins 163 also serve the secondary purpose of holding filter 131 approximately centered in the housing while the open end of the housing is closed.

This is accomplished by a removable closure member 170 having an outer annular groove 171 to engage a bead 172 at the end of housing 111, the joint being sealed by a gasket 173a. Closure member 170 has an annular groove 184, with a step 185, to sealingly engage portions 148 and 147a respectively of member 147. It also has a central aperture 186 to pass member 127 and the shoulder 187 of a wing nut 188.

Housing 111 is provided, near its open end, with a lateral outlet tube 190 for receiving particulate matter separated by centrifugal action. As is well known in the art, this tube is provided with an evacuator valve 192 which permits gravity discharge of particulate matter collecting in tube 190, by reason of vibration for example, without permitting significant air flow into housing 111.

OPERATION

In use cleaner 110 is inserted in an air flow line so that air, bearing undesired particulate matter in a range of sizes, can enter the cleaner at 116 and leave it at 122. A safety filter 130 is inserted into the housing over yoke 123 so that member 127 passes through aperture 136, and bevel 133b guides bead 122a into groove 133a. The filter is pressed firmly in place and clamp 137 is expanded, passed over lip 138, and allowed to contract. A principal filter 131 is now slid into housing 111, fins 163 helping to guide the operation, until mounting member 150 prevents further insertion. End cap 170 is applied over member 127 and wing nut 188 is tightened. Note that there is now no passage for air from inlet 116 to outlet 122 except through the filter, a triple seal being provided at 147a/185, 148/184, and 137/138 and a quintuple seal being provided at 152a/120, 151/117, 152b/134, 133c/117, and 133a/122a. The arrangement by which member 150 presses lip 134 against closure 117 is especially desirable, since it serves to maintain the seal 152b/134, while allowing the fit between groove 133a and bead 122a to be sufficiently relaxed to permit easy removal and replacement of safety filter 130.

The cleaner is now ready to be put into operation, which is done by drawing air through it. The air entering at 116 impinges on baffle 155, so the particles are not driven into any filter surface. The air flows to the right as seen in FIG. 1, being given a circumferential component of motion by fins 163 which causes the larger particles to pass outwardly to housing 111 and flow helically therearound until they pass through opening 189 into tube 190. Air containing smaller particles passes radially through the axially central part of filter 131 and also flows axially under baffle 155 and shield 149 so that practically the entire surface of filter 131 is operative. After passing through filter 131 the air passes through filter 130 and thence to outlet tube 122.

When a new filter 131 is in place, little particulate matter reaches 130. As the period of use increases the pores in filter 131 become more and more clogged with particulate matter and the pressure drop in the cleaner mounts to an undesirable level. When this occurs, it is necessary to interrupt the air flow to the cleaner, remove wing nut 188 and closure 170 and then remove filter 131 for replacement. Filter 130 is inspected, and is usually found in satisfactory condition: if not, clamp 137 is removed and filter 130 is replaced. Note that for the usual case, where filter 130 is satisfactory, the outlet tube 122 is at no time opened to the ambient atmosphere, but is protected by safety filter 130, hence the name of the latter.

Before reassembling the cleaner tube 190 is inspected and any material which may have been trapped therein is removed. Reassembly is the reverse of disassembly, starting with the replacement of the safety filter and concluding with the tightening of wing nut 188 and reestablishing air flow.

From the foregoing it will be clear that I have invented an improved air cleaner having a structure which combines improved sealing between the inlet and the outlet connections with ready and convenient replacement of filters, the bead and groove principle being adapted not simply for safety filters, but for general use in air cleaner construction.

Numerous characteristics and advantages of my invention have been set forth in the foregoing description, together with the details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

What is claimed is:

1. A filter, comprising a hollow body of porous material, having the shape of a truncated circular cone having an axis extending between a smaller end and a larger end;

a resilient connection annulus connected to said larger end of said body and including a flat axially outward surface and a radially inward concave surface including a medial circumferential groove;

and a centrally apertured resilient mounting member connected to and substantially occluding the small end of said body, said mounting member having a central lip extending axially around the central aperture.

2. An air cleaner removing, from a stream of air, solid particles in a range of sizes, comprising, in combination:

a housing, generally cylindrical about an axis extending between first and second ends thereof, having a lateral inlet opening near but spaced from said first end, an axial outlet opening and a peripheral inward step in said first end, and collecting means near said second end for receiving particulate matter;

filtering means in said housing for removing smaller particles from the air, comprising a hollow outer principal filter and a hollow inner safety filter, each having the shape of a frustrum of a cone with its larger end directed towards said first end of said housing and its smaller end closed and directed towards said second end;

means supporting said filtering means coaxially in said housing;

and sealing means preventing passage of air through said housing except through said filtering means, said sealing means including a first resilient annular mounting member at the larger end of said safety filter, axially contacting the inner wall of said first end, and having a radially outward peripheral lip, and a second resilient annular mounting member at the large end of said principal filter having radially outward and inward flat end surfaces axially engaging the inner surface of said step and the lip of said first resilient annular member, and a medial annular rib engaging the inner surface of said first end.

3. An air cleaner comprising:

(a) a generally cylindrical housing having an axis extending between first and second ends, an air inlet, and a fixed closure for said first end including an axial aperture;

(b) an outlet tube mounted in the axial aperture and projecting within the housing, said outlet tube having a circumferential bead at its inner end;

(c) a filter comprising a hollow body of porous material, a resilient connecting annulus connected to a first end of said body, and a centrally apertured resilient mounting member occluding a second end of said body, said annulus having a sealing surface which bears axially against said fixed closure, and having an inward groove engaging said bead, to prevent passage of air from said housing to said outlet tube passed the first end of said filter;

(d) means mounting said filter within said housing comprising a mounting yoke having legs secured to the inside of said outlet tube, said yoke extending axially of said housing through said filter and including a shaft passing outwardly through the aperture of said mounting member supporting said filter coaxially in said housing;

(e) and clamping means securing said mounting member frictionally to said shaft.

4. An air cleaner comprising:

(a) a generally cylindrical housing having an axis extending between first and second ends, a lateral inlet aperture near said first end, a removable closure for said second end, and a fixed closure for said first end including an axial aperture;

(b) an outlet tube mounted in the axial aperture and projecting within the housing, the outlet tube having an external circumferential bead at its inner end;

(c) a filter having the configuration of a frustum of a hollow circular cone and comprising a body of porous material, a resilient connecting annulus connected to a first end of said body, and a centrally apertured resilient mounting member occluding a second end of said body and having an axially directed outer lip, said annulus having a surface which bears axially against said fixed closure to prevent passage of air from said housing to said outlet tube passed said first end of said filter, and having an inward groove engaging said bead and supporting said first end of said filter;

(d) a mounting yoke having legs secured to the inside of said outlet tube, said yoke extending axially of said housing through said filter and including a shaft passing outwardly through the aperture of said mounting member to support said filter coaxially in said housing;

(e) clamping means for engaging said lip to secure said mounting member frictionally to said shaft;

(f) and means including a screw threaded portion of said shaft for securing said removable closure to said housing.

5. An air cleaner comprising:

(a) a generally cylindrical housing having an axis extending between first and second ends and an air inlet;

(b) a closure for said first end including an axial opening and a peripheral inward step, said axial opening defining an air outlet for the housing;

(c) a hollow safety filter mounted axially in said housing and including a first resilient annular mounting member axially engaging the inner surface of said closure around said opening, and having a radially outward peripheral lip;

(d) a hollow principal filter mounted axially in said housing around said safety filter and including a second resilient annular mounting member having radially outward and inward flat end surfaces, axially engaging the inner surface of said step of said closure and the lip of said first resilient member, and a medial annular rib engaging the inner surface of said closure;

(e) and means pressing said filters toward said closure to effect a triple sealing contact therebetween.

6. An air cleaner according to claim 5 in which said closure includes an outlet tube mounted in said axial opening and projecting within the housing, and said first resilient annular member engages the outer diameter of said tube within the housing to center the safety filter.

7. An air cleaner according to claim 6 in which said tube has a circumferential bead at its inner end and said first resilient annular member has a circumferential groove which mates with said bead and secures said safety filter to said end closure.

8. A filter comprising:

(a) a hollow body of porous material having an axis extending between first and second ends;

(b) a resilient connecting annulus connected to the first end of said body of porous material and including a flat axially outward surface and a radially inward concave surface including a medial circumferential groove;

(c) and a centrally apertured resilient mounting member connected to and substantially occluding the second end of said body, said mounting member having a central lip extending axially around the central aperture.

* * * * *

UNITED STATES PATENT AND TRADEMARK OFFICE
CERTIFICATE OF CORRECTION

PATENT NO. : 4,135,899
DATED : January 23, 1979
INVENTOR(S) : Daniel S. Gauer

It is certified that error appears in the above-identified patent and that said Letters Patent are hereby corrected as shown below:

Column 2, line 6, the word "internal" should be deleted.

Column 2, line 6, after the word "to" insert the word --removably--.

Signed and Sealed this

Eighth Day of May 1979

[SEAL]

Attest:

RUTH C. MASON
*Attesting Officer*

DONALD W. BANNER
*Commissioner of Patents and Trademarks*